March 20, 1951 R. W. NEWTON 2,545,745
WATERING SYSTEM FOR AGRICULTURAL, HORTICULTURAL,
AND SUCH LIKE PURPOSES
Filed Aug. 5, 1949
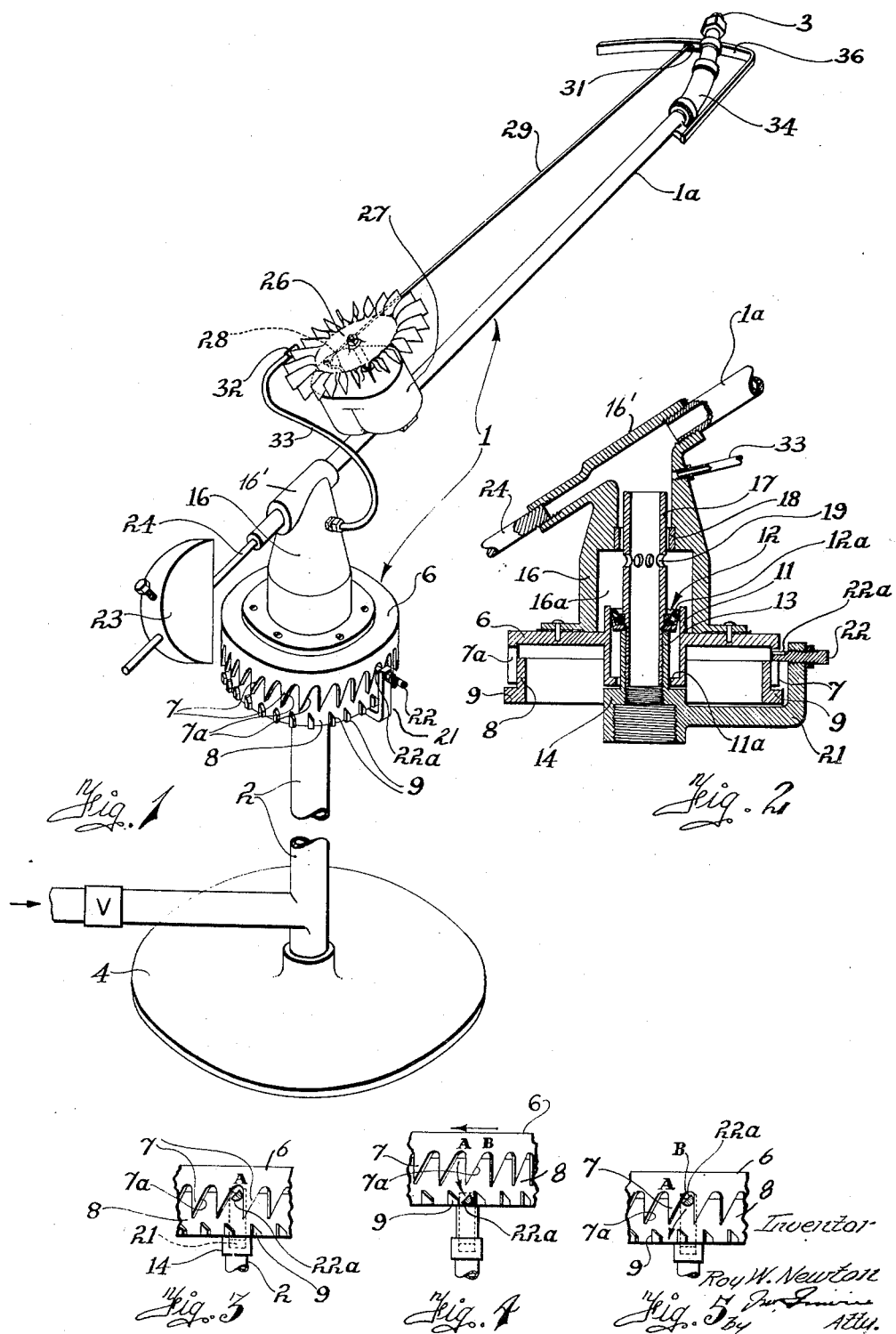

Patented Mar. 20, 1951

2,545,745

UNITED STATES PATENT OFFICE 2,545,745

WATERING SYSTEM FOR AGRICULTURAL, HORTICULTURAL, AND SUCH LIKE PURPOSES

Roy William Newton, Collingwood, Victoria, Australia

Application August 5, 1949, Serial No. 108,754
In Australia December 22, 1947

11 Claims. (Cl. 299—69)

This invention relates to watering systems applicable to a wide variety of purposes, including, amongst others, overhead spray irrigation for agricultural, horticultural purposes and the like, inhibition of frost, the cooling of buildings, protection against fires, and so on.

The invention is considered to be particularly well adapted to the carrying out of watering operations by overhead spraying and will therefore be described hereinafter more especially in relation to such duties by way of example.

With a view to obtaining in a practical form what may be conveniently termed "automatic spray irrigation," I have ascertained that certain fundamental features should be present and, in the specification of my prior United States patent application No. 47,256, filed September 1, 1948, I have described various important features including means for controlling the sequence or successive operation of a series or plurality of spraying devices in a system arranged over scattered areas, by the automatic opening and closing of valves controlling the supply of water under pressure to each spraying or discharge head of the series through the medium of a changeover device or regulator for each spray head to bring about the closing of its control valve and its subsequent reopening at predetermined intervals and variable periods during its cycle of operation and stepped rotation in a circular path, and the present invention utilizes such device or other suitable flow interrupter for causing the intermittent admission of water under pressure from a suitable supply source to the spraying devices to advance the same by a predetermined movement in an arcuate path between the respective spraying periods of the several spraying or watering devices and to hold said devices against movement during the spraying or discharge periods by reaction to the intermittent admission and shutting off of the supply or flow of the water under pressure thereto and the influence of said pressure and cessation thereof.

The present invention is a result of further research and experiment, all directed towards improving, simplifying and developing my previous inventions in order to attain "automatic spray irrigation" in a form that is as near perfection as possible.

The present invention is directed more especially to a manner and means for controlling the distribution of the spray water over a target area, in accordance with a predetermined cycle or programme which will be entirely automatic in action although it lends itself to ready adjustment when circumstances necessitate that there should be a change in the target area.

This automatic but variable control of distribution of the spray water is a further link in a chain of operations which, once set in motion, can continue overhead spray without any manual control or intervention.

My prior inventions, as will be readily understood, provide for automatic opening and automatic closing of spraying heads or intermittent supplying and cutting off of the water supply under pressure thereto, and the present invention enables an extension of the system so that it now becomes possible to ensure that the spray water can be confined to any particular area of ground over a given target area or areas of an arcuate or circular path to be intermittently or periodically sprayed or watered for most efficient results or growth and maintenance of vegetation in the best possible condition, which may often be highly important to a primary producer or to a person in charge of lawns, gardens and the like.

So far as I am aware, it is almost universal practice in connection with spray irrigation for the spray heads to be of the revolving type so that, while spraying is taking place, they turn continuously about a central axis with the result that a circular area of ground is covered.

The present invention departs fundamentally from this common and general practice by the fact that, while spraying is taking place through any spray head or nozzle, that head or nozzle remains stationary.

Still further, I contemplate utilizing the automatic closing and opening or spray control valves for supplying and shutting off the supply of water under pressure to the spraying devices or heads for intermittent discharge from the nozzles thereof whereby the pressure and cessation thereof is employed to cause each spray head in a system to make a predetermined movement in an arcuate or circular path in which it moves for spraying different portions of the area embraced and to be intermittently watered thereby for predetermined periods or intervals between the cessation of one spraying period and the commencement of the next spraying period of that head.

It is also contemplated to provide for predetermined but variable movement of each spray head between successive spraying periods so that practically any area, whether of regular or irregular general shape, can be covered during each completed cycle of operations. For example, such an area need not be continuous but can have unwatered gaps where, for various reasons, it is found that watering is not desired.

Another important advantage of the present invention is that it becomes possible to obtain automatic spray irrigation with water at comparatively low pressure, which means that the entire plant can be simplified, lightened and rendered less expensive to manufacture.

In spraying devices of the continuously revolving type, a substantial amount of the potential force available in the water supply main is absorbed in providing motive power for the revolving sprays. Such absorption of power does not occur with the present invention which therefore provides that such potential force is utilised in obtaining efficient distribution of the water over a maximum area and distance from the spray head.

Yet another advantage of the invention is that, by intermittent stationary spraying, undesirable evaporation and loss of water which is almost bound to occur with a high pressure rotary system of spraying is avoided, while the watering effect which is obtained is of the highest value.

The possibilities of the invention may be more readily understood by utilising a clock face as an example. Thus, an area correspondng to the space between 12 o'clock and 1 o'clock can be sprayed from a stationary jet for as long, or short, a period as has been previously determined by the time control factor determined by the sequence of operation of successive spraying or watering devices of a series, the time duration between intermitting spraying and areas covered and watered thereby. At the end of that period, spraying over the area from 12 o'clock to 1 o'clock is automatically cut off and, when water again flows through that spray head, the spray will be directed over the area from 1 o'clock to 2 o'clock. Consequently, if twelve automatic stops of water flow and resumption takes place through each spray head, then in a complete cycle the entire area represented by the clock face will have been covered by stationary spraying.

The precise manner and means that may be adopted for effecting rotary or traversing movements of the spray heads between their successive spraying periods, is not of particular importance provided that it is sound mechanically, thoroughly automatic in action, while permitting of adjustment as and when desired.

One feasible way of carrying out the invention is to provide for the spraying head, simultaneously with the automatic cutting off of water thereto, to be influenced by gravity and, in so doing, automatically to index itself and be turned through a predetermined arc or path, so that when the water is again turned on to that spraying head, it will be in a new position to resume stationary spraying.

Also, means is provided so that upon automatically supplying water under pressure to the spraying head, the latter is caused to move or rise in the direction of its axis under the influence of the water pressure and simultaneously turn through a predetermined arc or path to be indexed to a new spraying position, for use in conjunction with or independently of the turning and indexing on lowering or dropping by gravity, and then to be held against turning after being raised and turned or indexed to a new spraying position by the water pressure during the spraying period.

The following description, to be read in conjunction with the accompanying drawings, relates to one practical embodiment of the invention.

In the drawings:

Figure 1 is a perspective view showing a spray head and associated parts.

Figure 2 is an enlarged cross sectional view of an automatic indexing portion of the apparatus shown in Figure 1.

Figures 3, 4 and 5 are somewhat diagrammatic views showing stages in movement of the automatic indexing portion of the apparatus.

Very simple mechanism may be adopted to bring the desired action about, as the pressure of water entering a telescopic spray head assembly may force the assembly up for a given distance. However, a cam or other such member associated with the spray head assembly may then come into action to turn the latter until it comes against a stop whereupon the turning motion to said spray head is shut off and arrested. When the water pressure is diverted to another spray head, there is no pressure available to hold up the first spray head assembly so that it falls by gravity, the cam preferably traversing down a ramp or incline which brings about an index of any predetermined number of degrees of advancement around the "clock face," or arcuate movement of the spray head assembly.

The apparatus illustrated in the drawings comprises a spray head assembly 1 (Figure 1) mounted upon a pipe 2 through which water is intermittently supplied and cut-off by the automatic opening and closing of a valve or flow interrupter represented diagrammatically at V so as to be fed to the outlet nozzle 3 at the outer extremity of a tubular arm 1a. The conduit 2 may be supported upon a base 4.

The lower part of the spray head assembly comprises the automatic indexing device for effecting and determining the extent of turning of the spray head between successive spraying periods. As best seen in Figure 2, this device includes a disc member 6 provided around its periphery with circumferentially spaced, downwardly directed teeth 7, forming a sinuous track or cam way. One face of each tooth is substantially vertical with the other face inclined to form a ramp 7a for a purpose later made clear.

A ring member 8 is disposed within, and secured to, the disc 6 and carries abutment stops 9 which are positioned beneath and in vertical alignment with the gaps between the teeth 7.

Disc 6 has a central vertically extending cylinder 11, accommodating an annular piston constituting a stop member or ring 12 secured around a stationary tube 13 and provided with an annular rubber or like packing ring 12a to ensure an efficient water seal under operative conditions. Tube 13 is enlarged at its lower end to form a socket 14 into which the upper end of pipe 2 is screwed or otherwise suitably connected.

A hollow casing 16 is secured to the upper face of the disc 6 in a leak-proof manner and is shown provided with an open-ended inclined tubular cross-head or socket 16' adapted to receive the inner end of the inclined tubular arm 1a.

A sleeve 17 is secured to the tube 13 and extends upwardly into chamber 16a provided by the casing 16. The sleeve 17 may have a number of orifices 19 so that communication is established between the pipe 2 and the chamber 16a and extends up through a bearing sleeve or bush 18 fixed in the restricted upper part of casing 16 at the top of chamber 16a, the top of which forms a pressure abutment for the water in lifting the spray head.

The spray head assembly, including the casing 16, disc 6 and ring 8, is capable of limited vertical movement in relation to the central tubular parts 13, 14 and 17 and, in order to steady and guide such movement, a bearing flange 11a may be provided at the lower end of the cylinder 11, and the bearing bush 18 may be located within that part of casing 16 above chamber 16a and orifices 19 into which the sleeve 17 projects. The vertical movement of the spray head assembly including disc 6, ring 8 secured thereto within teeth 7, cylinder 11, casing 16 and parts carried thereby may be limited downwardly by engagement of the flange 11a with the upwardly facing shoulder at the upper end of the enlargement at the lower end of the stationary tube 13 forming the socket 14 for attachment on the upper end of the upright pipe 2, and upwardly by engagement of the flange 11a with the piston or stop ring 12 secured to and between stationary tube 13 and sleeve 17 carried thereby or secured thereto, preferably detachably and adjustably as by threading the sleeve 17 in the tube 13.

An arm 21 outstanding from the lower portion of the central tube 13 at its socket 14 is adapted to support an axially and rotatably adjustable radial pin 22, the inner end of which is of segmental cross-section (see Figures 3, 4 or 5) to form a cam 22a and is arranged to be normally located between adjacent teeth 7 or between adjacent abutment stops 9.

A counterweight 23, mounted upon a rod 24 supported by the casing 16 in the inclined socket 16', and extending downwardly therefrom in continuation of or alignment with tubular arm or pipe 1a, is provided to counterbalance the weight of the pipe 1a and any components or accessories carried thereby, and so stabilise the spray head assembly about its central support.

In Figures 3, 4 and 5, one of the gaps between the teeth 7 is identified by the reference A and in Figure 3 the cam 22a is shown accommodated in this gap A with the spray head assembly lowered by gravity as when the water pressure is lowered or cut off.

In operation, when water under pressure is admitted to the spray head assembly by way of pipe 2, the disc 6, together with parts carried thereby including ring 8, casing 16, cross head or socket 16', tubular arm 1a, etc., is caused to rise by virtue of the pressure in chamber 16a at its top abutment wall and the cylinder 11 and upon piston 12. At the same time, water passes through pipe 1a and issues from nozzle 3 in the form of a spray.

While the member 6 was rising from the position shown in Figure 3 to the position shown in Figure 4, the cam 22a engaged with an inclined face of an abutment stop 9, thereby causing the ring 8 and member 6 to be turned and the cam 22a to be disposed between that abutment stop and the next stop, which prevents turning of the parts while spraying is taking place. (See Figure 4.)

When the water is cut off from the spray head assembly, the disc 6, together with parts carried thereby, descends under the influence of gravity. During this descent, the cam 22a engages the inclined face or ramp 7a of the respective tooth 7 located thereabove riding down against said cam so that the disc 6 comes to rest with the cam 22a located at the upper end of the next succeeding gap B (Figure 5) or the upper end or crotch of said gap over the cam to turn ring 8, disc 6, and parts carried thereby to the left, as indicated by the arrow in Figure 4 to the position shown in Figure 5. It will therefore be seen that the rotary parts have, through the disconnection and subsequent connection of pipe 2 to the pressure supply line, been turned to a predetermined extent and that such cycle of operations can proceed automatically and indefinitely.

It is desirable that the nozzle 3 be slightly angularly offset from the axis of the arm 1a, so that the natural reaction of the issuing spray is to turn the spray head assembly in the required direction. Such tendency to rotation assists the functioning of the indexing apparatus but is not essential and, in any event, is limited by action of the apparatus itself.

A further feature of the invention is that, by removing any one or more of the stops 9 which may be readily made detachable for the purpose, so can a given zone of the general target area be left unwatered. This is particularly advantageous where spraying operations are taking place near a fence or boundary line. Thus, by way of example, the cycle of operations with reference to the clock dial might be 9—10—11—12—1—2—3. After the 3 o'clock area has been sprayed, and the spraying head stops by the cutting off of the water supply thereto, then the next indexed position will not be a 4 o'clock but will be at 9 o'clock, as the spraying head assembly will rotate under the impelling action of the discharged water issuing from the outlet nozzle 3 where the teeth 7 and stops 9 are omitted or removed to leave the spray head assembly free to turn until this operative position is reached. In such a case, it will be appreciated that the area which has been watered will approximate to a semi-circle.

Other variations in area or zone of distribution of the spray will be readily apparent from the foregoing.

Although in the foregoing description, it has been assumed that the nozzle 3 remains stationary while spraying is taking place, it may, in some cases, be desirable for the nozzle to be oscillated to a limited extent during periods of spraying and this may be effected by means of a Pelton or water wheel 26 (see Figure 1) which drives, through suitable reduction gearing within a casing 27, a crank 28 connected by link 29 with a projecting lug 31 upon the spray nozzle. The Pelton wheel may be driven by a relatively finely divided spray issuing from a nozzle 32 connected by conduit 33 to the interior of the casing 16.

With such an arrangement, the spraying nozzle 3 should be flexibly connected to the arm 1a as by medium of a length of flexible hose 34, to thereby permit the oscillation of the nozzle while an arcuate member 36 for guiding the nozzle may be suitably affixed to the arm 1a.

In operation, the finely divided water spray after impinging against the Pelton wheel will effectively water the area in the vicinity of the spraying head assembly.

Having now described my invention, what I claim as new and desire to secure by Letters Patent is:

1. A watering device comprising a stationary support, a water supply inlet to the support, a device in the water supply inlet for intermittently admitting water to the support, a spray head, horizontally rotatable means mounted on the support and carrying the spray head, said last named means being constructed and arranged for vertical movement relative to the stationary support and including a disk-like member having a side wall, a plurality of cam members mounted on the top and bottom of the side wall, and an indexing pin affixed to the stationary support and arranged in slidable engaging relation to the cam members, whereby the intermittent supply of water will cause rising and lowering movement of the rotatable means and the engaging of the pin with the cams will cause horizontal rotation of the rotatable means.

2. A watering device comprising a stationary support, a water supply inlet carried by the support, means for intermittently admitting and shutting off a water supply under pressure to the inlet, a spray head rotatable on the support in communication with the inlet and constructed and arranged for sliding movement in the direction of the axis of the rotatable spray head, said spray head having an annular series of spaced cam members around the axis, a stationary indexing member fixed to the support and arranged for sliding engagement by a cam member in any rotative position of the spray head upon sliding movement of the latter, whereby the intermittent supply of water will cause said sliding movement of the spray head and the engaging of the indexing member with the cams upon sliding movement of the spray head will cause partial rotation of the head to successive indexing positions, and means to positively check rotation of the head after each indexing movement while the spray is in operation as long as the pressure remains on.

3. A watering device comprising a stationary inlet pipe, a device to supply water under pressure intermittently to the inlet pipe and shutting off same, a spray head with an outlet nozzle and horizontally rotatable on the inlet pipe, said spray head being constructed and arranged for vertical movement relative to the inlet pipe and including a casing with a circular part having fixed upper and lower annular rows of cam members and stops and a confined chamber communicating with the inlet pipe to receive water therefrom under pressure whereby the intermittent supply of water will result in raising and lowering of the spray head, and a radially adjustable cam pin carried by the inlet pipe in position for engagement by the cam members during the raising and lowering of the cam members with the spray head to cause simultaneous partial rotation of the spray head to index the position thereof in a circular path and the engagement of a stop with said cam pin when the spray head is raised to prevent rotation of the spray head while the water is issuing therefrom.

4. A watering device comprising a suitably supported stationary water inlet pipe to which water under pressure is intermittently supplied, a spray head mounted for rotation and limited reciprocatory movement on the axis of rotation and including a casing with a confined chamber to which the water is admitted from the inlet pipe to raise the spray head intermittently when the water is supplied and to allow same to descend when the water supply is shut off, a cam device including a plurality of cam members around the casing, and a stationary indexing member supported in position for sliding engagement by a cam member in any rotative position of the spray head upon reciprocation of the spray head, whereby the intermittent supply of water will cause raising and lowering of the spray head and the engaging of the stationary member with the cams will cause partial turning of the spray head through a predetermined arc about the axis.

5. A watering device as defined in claim 4, wherein a row of spaced abutments is provided on the casing in position to engage the stationary indexing member when the head is raised to hold the spray head from turning when the water is being supplied thereto.

6. A watering device as defined in claim 5, wherein the spray head is provided with an outwardly extending hollow spray arm and a spray nozzle on one end of the spray arm extending in angular relation thereto so that water issuing from the nozzle sets up a reaction which assists turning movement of the spray head at and between the cams.

7. A watering device as defined in claim 4, wherein the spray head is provided with a hollow spray arm having a counter-balanced spray nozzle at its outer end communicating with the casing and inlet pipe and constructed and arranged to assist in turning the spray head when water is issuing therefrom.

8. A watering device as defined in claim 7, wherein the spray nozzle is flexibly connected to said spray arm, and means are provided to automatically oscillate said nozzle while the spraying is taking place.

9. A watering device as defined in claim 8, in combination with an arcuate member fixed to the spray arm cooperating with the flexibly mounted spray nozzle to support and guide said nozzle during its oscillation.

10. A watering device as defined in claim 9, wherein said last-mentioned means comprises a water wheel, a by-pass tube leading from said spray head and terminating in a nozzle for directing a spray jet of water against said wheel, and a crank and connecting rod extending between said wheel and the flexibly mounted spraying nozzle for oscillating the latter.

11. A watering device as defined in claim 10, wherein a reduction gearing is provided between said water wheel and said crank.

ROY WILLIAM NEWTON.

REFERENCES CITED

The following references are of record in the file of this patent:

UNITED STATES PATENTS

| Number | Name | Date |
|---|---|---|
| 586,161 | Buchanan | July 13, 1897 |
| 1,388,440 | Prestgard | Aug. 23, 1921 |
| 1,832,205 | Harris | Nov. 17, 1931 |
| 1,930,983 | Russell | Oct. 17, 1933 |
| 1,970,126 | Buckner | Aug. 14, 1934 |
| 1,998,592 | Schenk | Apr. 23, 1935 |
| 2,212,008 | Buelna | Aug. 20, 1940 |